(12) United States Patent
Odai et al.

(10) Patent No.: US 6,219,206 B1
(45) Date of Patent: Apr. 17, 2001

(54) MAGNETO-RESISTIVE EFFECT TYPE HEAD

(75) Inventors: Shiroyasu Odai, Odawara; Matahiro Komuro, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/383,214

(22) Filed: Aug. 26, 1999

(30) Foreign Application Priority Data

May 18, 1999 (JP) .................................................. 11-136758

(51) Int. Cl.[7] ........................................................ G11B 5/39
(52) U.S. Cl. ............................................. 360/320; 360/323
(58) Field of Search ..................................... 360/320, 323

(56) References Cited

U.S. PATENT DOCUMENTS

| 5,375,022 | 12/1994 | Gill et al. . | |
|---|---|---|---|
| 5,539,598 | 7/1996 | Denison et al. . | |
| 5,557,492 | * 9/1996 | Gill et al. ............................. | 360/113 |
| 5,644,455 | * 7/1997 | Schultz .................................. | 360/113 |
| 5,966,273 | * 10/1999 | Matsumoto et al. ................. | 360/113 |
| 5,986,857 | * 11/1999 | Hirano et al. ........................ | 360/113 |
| 6,046,890 | * 4/2000 | Yamada et al. ....................... | 360/113 |

FOREIGN PATENT DOCUMENTS

| 7-65324 | 3/1995 | (JP) . |
|---|---|---|
| 8-221720 | 8/1996 | (JP) . |

* cited by examiner

Primary Examiner—William Klimowicz
(74) Attorney, Agent, or Firm—Mattingly, Stanger & Malur, P.C.

(57) ABSTRACT

In a magneto-resistive effect type head having provided between a lower shield layer and an upper shield layer an MR sensor with a magneto-resistive effect or a gigantic magneto-resistive effect; electrode layers electrically connected to the MR sensor; and lower and upper insulating layers mangetically and electrically isolating the MR sensor and the electrode layer from the shield layers, when the gap length is reduced and the lower and upper insulating layers are decreased in thickness, the insulating layers are more liable to a dielectric breakdown by static electricity produced in the manufacturing process of the magnetic head. In a magneto-resistive effect head, the portion of the insulating layer in which the MR sensor 30 and the lower or upper shield layer 10 or 60 do not face each other (in other words, the second lower insulating layer 22 or the second upper insulating layer 52) is formed by a lower-resistivity insulating film than the other portion of the insulating layer in which the MR sensor and the layers 10 or 60 face each other (in other words, the first lower insulating layer 21 or the first upper insulating layer 51). If electric charge accumulates in the electrode layer or shield layer by static electricity, a minute current flows through the low-resistivity insulating film, reducing a potential difference between the electrode layer and the shield layer and therefore the insulating layers can be prevented from breaking by static electricity.

20 Claims, 6 Drawing Sheets

MAGNETO-RESISTIVE EFFECT TYPE HEAD

BACKGROUND OF THE INVENTION

The present invention relates to a magneto-resistive effect type head for reading an information signal from a magnetic medium and more particularly to a magneto-resistive effect type head having a structure capable of preventing the destruction of the insulation layer by static electricity.

With the down-sizing and performance improvement of the magnetic recording apparatuses in recent years, the magneto-resistive effect type head (hereafter referred to as the MR head) utilizing the magneto-resistive effect is used as the head for reading an information signal from the magnetic medium. FIG. 1 shows an example of the MR head. The MR head has a composite structure including a recording head 1 utilizing electromagnetic induction to write information and a reproducing head 2 utilizing a magneto-resistive effect (MR) or a giant magneto-resistive effect (GMR) to read the information signal from the magnetic medium.

FIG. 2 shows an example of the reproducing head in a view facing the magnetic medium. The reproducing head includes an MR sensor 30, electrode layers 40, a lower insulating layer 20, and an upper insulating layer 50, which are all disposed between a lower shield layer 10 and an upper shield layer 60. Generally, the bias layers 45 to apply a vertical bias magnetic field to the MR sensor 30 are provided on both sides of the MR sensor 30 (Normally, the bias layers and the electrode layer are formed successively).

The lower insulating layer 20 and the upper insulating layer 50 performs the function to magnetically and electrically isolate the MR sensor 30 from the lower shield layer 10 and the upper shield layer 60. As the material for the insulating layers, an aluminum oxide (alumina) film is generally used which is non-magnetic and superior in electrical insulating properties. The space where the MR sensor 30 is disposed between the lower shield layer 10 and the upper shield layer 60 is defined as a gap length GL. In a magnetic recording apparatus, the gap length GL is an important parameter related to bit length.

SUMMARY OF THE INVENTION

Magnetic recording apparatuses are becoming smaller and improving in performance year by year and accordingly the gap length GL of the reproducing head to read information is becoming narrower. In consequence, the trend of the lower insulating layer 20 and the upper insulating layer 50 has been toward a thinner film thickness.

As the lower insulating layer 20 and the upper insulating layer 50 become narrower, those insulating layers are liable to dielectric breakdown due to static electricity produced in the magnetic head manufacturing and assembling processes. Measures have been taken to prevent static electricity from accumulating in the magnetic head manufacturing and assembling processes. However, it is impossible to achieve complete prevention of dielectric breakdown caused by static electricity in those processes. Therefore, the structure of the magnetic head must be so formed as not to suffer dielectric breakdown even if static electricity is produced to some extent.

JP-A-07-65324 (U.S. Pat. No. 5,539,598) and JP-A-07-65330 disclose methods in which the shield layer and the electrode layer are shorted electrically.

Moreover, JP-A-08-221720 (U.S. Pat. No. 5,375,022) reveals a method in which the shield layer and the electrode layer are connected by a high-resistivity magnetic material. Those methods, when static electricity occurs, bring the MR sensor 30 and the shield layer to the same potential when static electricity occurs to thereby prevent a breakdown of the insulating layers between the MR sensor and the shield layers. However, there is a decrease in output because the sense current splits from the electrode layer and flows to the shield layers even when the magnetic head is operating in the reproducing apparatus.

An object of the present invention is to provide a magneto-resistive effect type head of a structure capable of preventing a breakdown of the insulating layers between the MR sensor and the shield layers attributable to the occurrence of static electricity even when the gap length is made narrow.

Another object of the present invention is to provide a magneto-resistive effect type head of a structure in which the sense current does not shunt from the electrode layer and flows into the shield layers even when the magnetic head according to the present invention is mounted in a magnetic recording apparatus as shown in FIG. 9 and put into operation.

In the magneto-resistive effect type according to the present invention, the portions of the insulating films in which the MR sensor and the lower and upper shield layers do not face each other are formed by an insulating film with a lower resistivity than the other portions of the insulating films in which the MR sensor and the lower and upper shield layers face each other.

According to an aspect of the present invention, a magneto-resistive effect type head comprises between a lower shield layer and an upper shield layer:

an MR sensor including a thin film having at least a magneto-resistive effect or a gigantic magneto-resistive effect, bias layers for applying a longitudinal bias magnetic field to the MR sensor, and electrode layers for supplying a detection current to the MR sensor, and a lower insulating layer between the MR sensor and the lower shield layer and an upper insulating layer between the MR sensor and the upper shield layer, the two insulating layers being located at that part of the head which faces a magnetic medium, wherein portions of the lower and upper insulating layers in which the MR sensor and the lower and upper shield layers do not face each other have a lower resistivity than the other portions of the lower and upper insulating layers in which the MR sensor and the lower and upper shield layers face each other.

According another aspect of the present invention, in the magneto-resistive effect type head, the lower-resistivity portions of the insulating layers in which the MR sensor and the shield layers do not face each other exclusive of the other portions of the insulating layers in which the MR sensor and the shield layers face each other may be set either between the MR sensor and the lower shielding layer or between the MR sensor and the upper shielding layer. Namely, either all over the insulating layer between the MR sensor and the lower shielding layer or all over the insulating layer between the MR sensor and the upper shielding layer is formed of an insulating film with low resistivity.

The low-resistivity portions of the insulating layer in which the MR sensor and the lower and upper shield layers do not face each other are preferably formed by a nitride or an oxy nitride of aluminum, silicon or a mixture of those elements.

This low-resistivity insulating layer preferably has a characteristic that the resistivity at an applied electric field of 3 MV/cm is less than 1/1000 of the resistivity at an applied electric field of 1 MV/cm.

DESCRIPTION OF THE EMBODIMENTS

Figure 3:
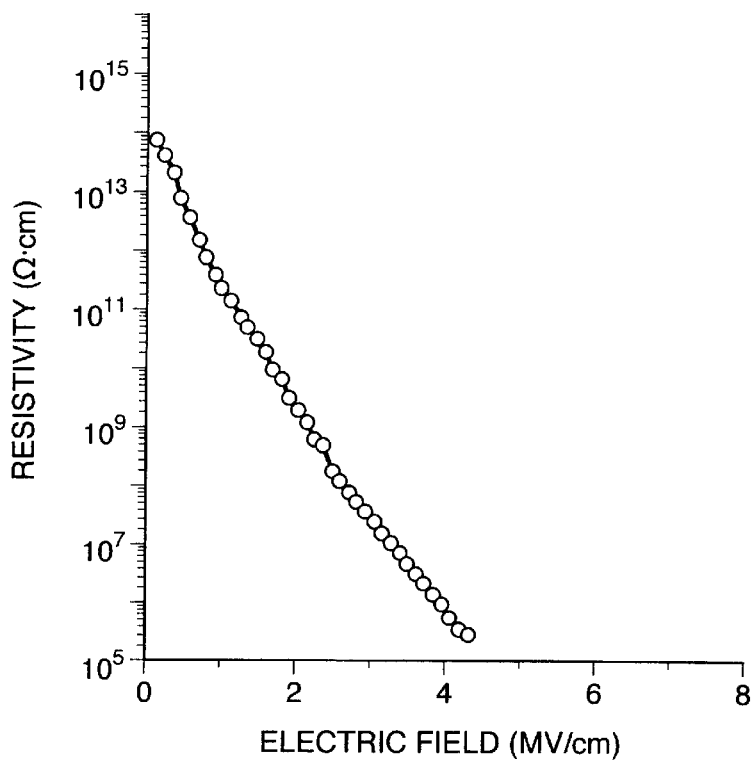
FIG. 3 is a diagram showing the resistivity versus electric field characteristics of silicon nitride.
Figure 4:
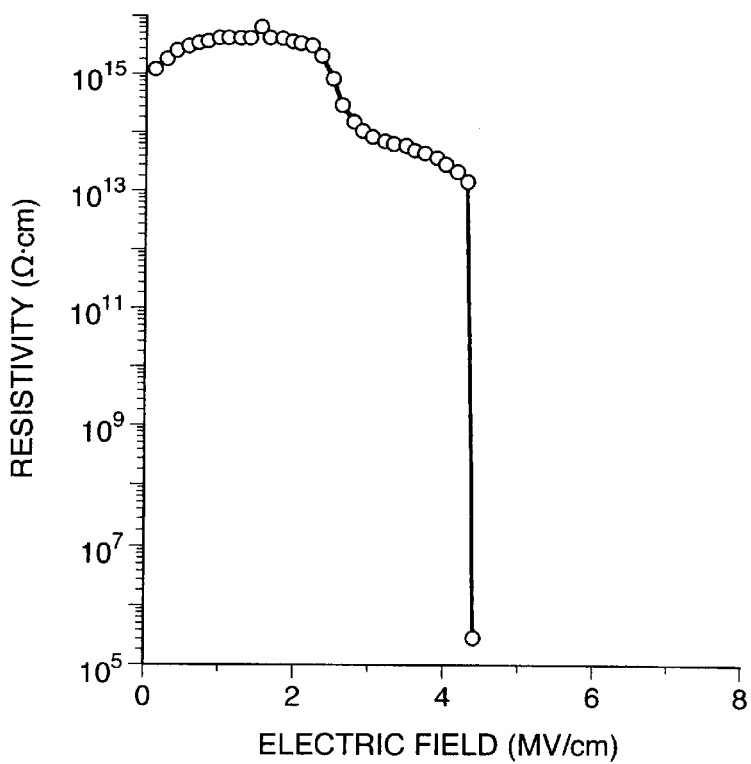
FIG. 4 is a diagram showing the resistivity versus electric field characteristics of alumina.

FIG. 3 shows the resistivity versus electric field characteristics of silicon nitride as an example of a low-resistivity insulating film. For comparison's sake, FIG. 4 shows the resistivity versus electric field characteristics of alumina currently widely used in the upper and lower insulating layers. Note that the electric field here is a value obtained by dividing the applied voltage by the film thickness. In the case of alumina, even when the electric field is increased, the resistivity changes by two to three orders of magnitude.

For silicon nitride, the resistivity decreases as an exponential function as the electric field is increased. For example, when the electric field is 1 MV/cm and 3 MV/cm, the resistivity is of alumina $10^{15}\Omega\cdot cm$ and $10^{14}\Omega\cdot cm$. On the other hand, the resistivity of silicon nitride is $10^{12}\Omega\cdot cm$ and $10^{8}\Omega\cdot cm$. In other words, when the electric field is 1 MV/cm, the resistivity of silicon nitride is smaller by three orders of magnitude than for alumina, but when the electric field is 3 MV/cm, the resistivity of silicon nitride is smaller by six orders of magnitude than with alumina. Among materials, such as silicon nitride, the resistivity of which decrease as an exponential function with increasing electric field are AlN, Si—Al—N, Si—Al—N—O, SiC, DLC and so on. Oxide insulating materials very deficient in oxygen exhibit similar electric characteristics.

By utilizing a difference in resistivity between the insulating films, it is possible to manufacture a head free of destruction of the insulating layers caused by static electricity. More specifically, a high resistivity insulating film, such as alumina, is used where the film thickness must be thin while the insulating properties are maintained. On the other hand, where there is not a strict definition for film thickness, it is only necessary to use a low-resistivity insulating film, such as silicon nitride, in the insulating layer placed between an electrode layer and a shield layer or between a metal layer such as these and another metal layer electrically connected to such a metal layer. For example, when there is a high potential difference between a shield layer and an electrode layer attributable to static electricity or the like, the silicon nitride under a high voltage decreases in resistivity by several orders of magnitude than alumina (a decrease by six orders of magnitude in resistivity when the electric field is 3 MV/cm). Therefore, a leak current flows through the low-resistivity insulating film, so that the potential difference between the shield layer and the electrode layer can be reduced. Consequently, the insulating layers can be prevented from suffering dielectric breakdown. Moreover, the larger the area of the metal layers having the low-resistivity insulating film held therebetween, the more easily the leak current flows. The low-resistivity insulating film is required to have a thickness large enough not to suffer a dielectric breakdown.

When a head structured as described is mounted as is in the magnetic recording apparatus and put into operation, the silicon nitride has an insulation resistance close to that of alumina in the ordinary operation range. Therefore, it never occurs that a sense current leaks to the shield layer and gives rise to noise.

Figure 1:
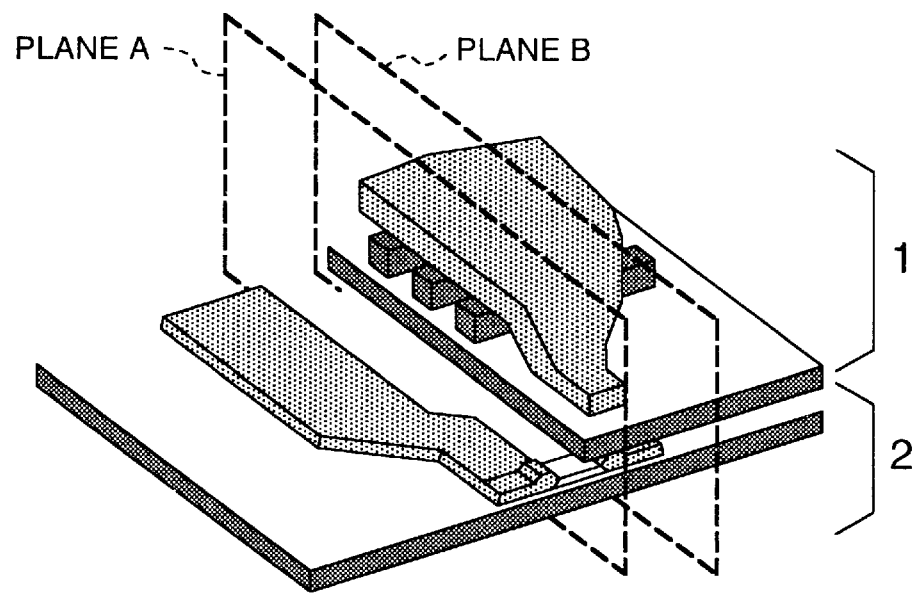
FIG. 1 is a view of an example of a conventional magneto-resistive effect type head structure.
Figure 2:
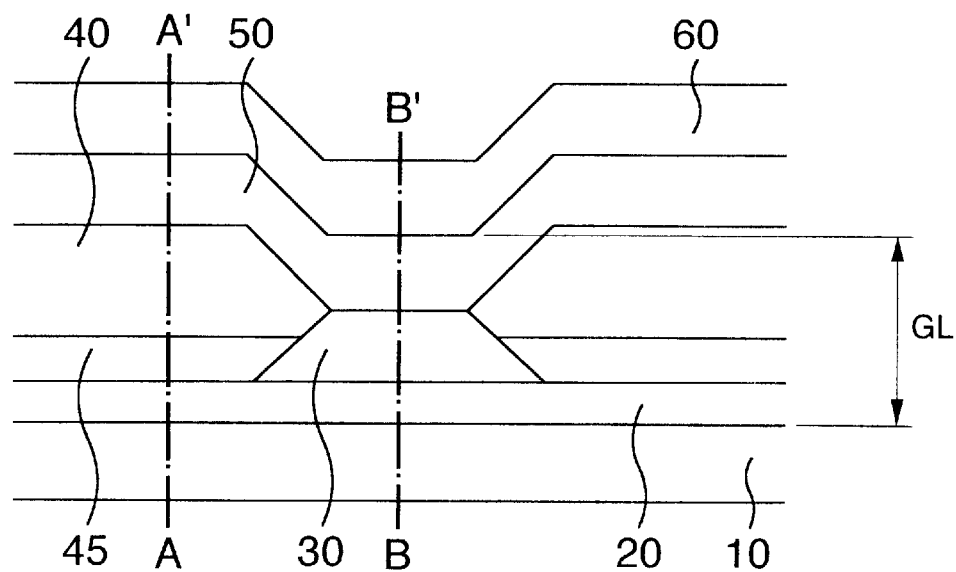
FIG. 2 is a view of the reproducing head as a conventional magneto-resistive effect type head as seen from the surface of a magnetic medium facing the reproducing head.
Figure 5A:
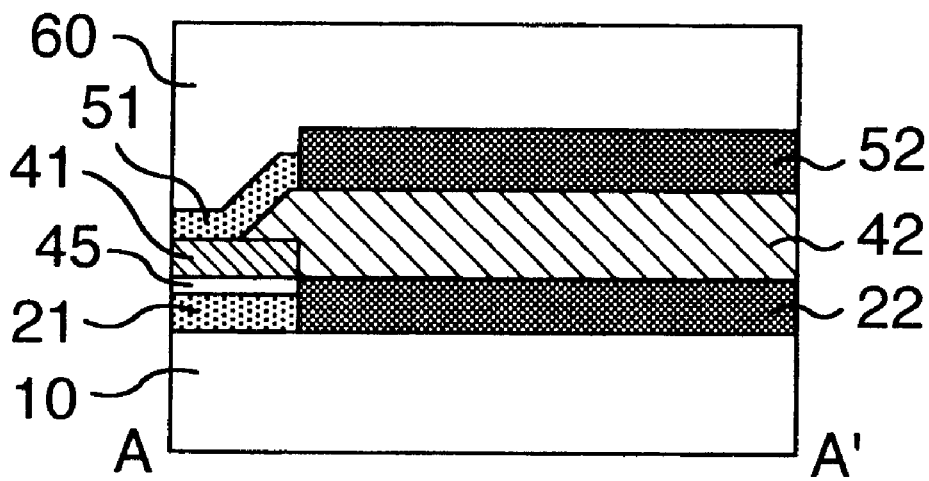
FIGS. 5A and 5B are sectional views in the depth direction of the reproducing head part of the magneto-resistive effect type head structure according to a first embodiment of the present invention.
Figure 5B:
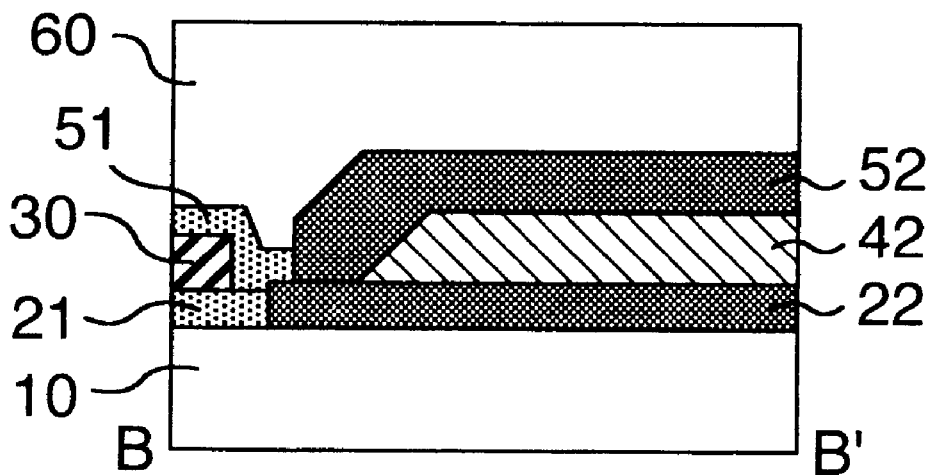

FIGS. 5A and 5B a first embodiment of the present invention. FIGS. 5A and 5B indicate cross sections taken along planes A and B of the magnetic head depicted in FIG. 1.

A portion of the insulating layer in which at least the MR sensor 30 and the lower shield layer 10 face each other (in other words, the first lower insulating layer 21) and another portion of the insulating layer in which at least the MR sensor 30 and the upper shield layer 60 face each other (in other words, the first upper insulating layer 51) are formed by a high-resistivity insulating film, such as $Al_2O_3$, $SiO_2$ or a mixture of them and the other portions of the insulating layers (in other words, the second lower insulating layer 22 and the second upper insulating layer 52) are formed by a low-resistivity insulating film, such as silicon nitride. The first lower insulating layer 21 and the first upper insulating layer 51 are the portions whose thickness is becoming thinner with progressively higher integration in magnetic recording apparatuses. Therefore, it is necessary to prevent the current flowing through the MR sensor 30 and the electrode layer 40 from being divided and flowing through the above-mentioned portions even If the film thickness is made thinner. It is also necessary to increase strength against dielectric breakdown by static electricity. Meanwhile, there is no stringent prescription for the second lower insulating layer 22 and the second upper insulating layer 52. If a low-resistivity insulating film, such as silicon nitride, is used for the second lower insulating layer 22 and the second upper insulating layer 52 to let excess charge such as static electricity, when it occurs, move through the second lower insulating layer 22 and the second upper insulating layer 52 to the adjacent metal layers, then a large potential difference does not occur among the lower shield layer 10, the electrode layer 40, the MR sensor 30 electrically connected to the electrode layer 40, and the upper shield layer 60. Consequently, even if the first lower insulating layer 21 and the first upper insulating layer 51 are made thin, dielectric breakdown hardly occurs in the first lower insulating layer 21 and the first upper insulating layer 51.

An example of a method of manufacturing this head will be described in the following. FIGS. 6A to 6E show the process steps of the patterns on a substrate.

Figure 6A:
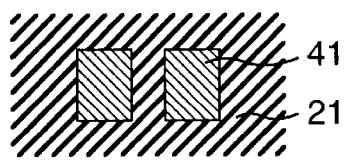
FIGS. 6A to 6G are the manufacturing process steps of the reproducing head part of the magneto-resistive effect type head structure according to the first embodiment of the present invention.

A lower shield layer 10 (Sendust, Fe—Ni, or the like) is formed on a suitable substrate. A first lower insulating layer 21 is formed. This insulating layer 21 has as its main object to provide an electrical and magnetic insulation of the MR sensor 30 from the lower shield layer 10 and is formed by $Al_2O_3$, $SiO_2$ or a mixture of them. On top of the insulating layer 21, an MR sensor film is formed. The MR sensor 30 is a sensor utilizing a magneto-resistive effect or a giant magneto-resistive effect. The first lower insulating layer 21 and the MR sensor 30 are deposited tentatively on the whole upper surface of the substrate. Other methods, such as resist and ion milling, may be used to form desired patterns. A resist pattern in a stencil form is made to form bias layers 45 and first electrode layers 41 in specified positions. The MR sensor film is shaped by ion milling with this resist pattern as a mask, and then bias layers 45 and a first electrode layer 41 are formed. For the first electrode layer, a high refractory metal, such as Ta, is used from a viewpoint of electromigration. Or otherwise, the first electrode layer 41 may be formed by a material with a low resistivity, such as Au or Al. Subsequently, the resist is removed by a resist stripping solution. FIG. 6A shows the condition after the resist has been removed.

Figure 6B:
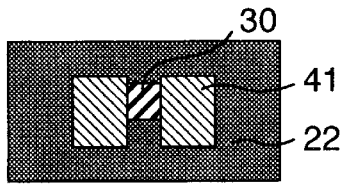

A resist pattern in a stencil form is created to pattern the MR sensor 30 to a specified shape and to remove excesses of the first lower insulating layer 21. Excesses of the MR sensor and the first lower insulating film are removed by ion milling or the like with this resist-pattern mask. Or otherwise, after the MR sensor 30 has been shaped to a specified pattern, it is possible to remove the resist and create a resist-pattern mask to remove excesses of the first lower insulating film. After excesses of the first lower insulating film have been removed, a second lower insulating layer 22 is deposited by using the same resist pattern. As the material for this insulating layer 22, a low-resistivity insulating film mentioned above is used. There is no strict definition for film thickness. It is only required that a high-quality film be formed in a stable manner. In the present invention, the film is deposited to a thickness of 100 nm or so. Afterwards, the resist is removed. FIG. 6B shows the condition after the resist has been removed.

Figure 6C:
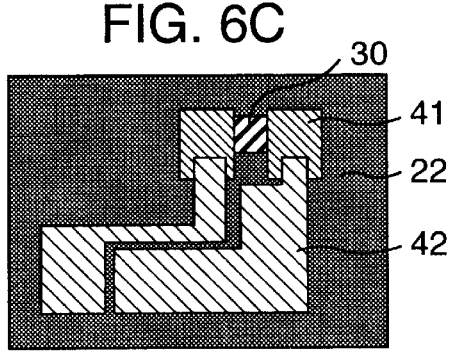

To connect the first electrode layers 41 to terminals, second electrode layers 42 are formed (FIG. 6C). The second electrode layers are preferably made of a low-resistivity material, such as Au, Al or Cu. The second electrode layer 42 is formed on top of the second lower insulating layer 22.

Figure 6D:
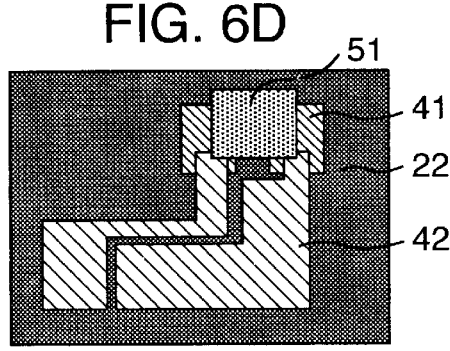

A resist pattern in a stencil form is created for use in forming the first upper insulating layer 51 in a specified position, and by using this resist pattern, a high resistivity insulating film, such as $Al_2O_3$ or $SiO_2$, is formed. Or otherwise, it is possible to form the first upper insulating layer 51 on the whole surface of the substrate and then create a specified pattern by using a resist pattern or by ion milling, for example. Note that when forming the first upper insulating layer 51, the parts forming the electrode terminal 63 is protected by a resist pattern to prevent it from being deposited by a high-resistivity insulating film. FIG. 6D shows the condition after the first upper insulating layer 51 of a specified shape has been formed.

With a resist pattern formed on the first upper insulating layer 51 and the parts forming the electrode terminal 63, the second upper insulating layer 52 is formed. To this end, a low-resistivity insulating material is used. For the same reason as mentioned about the second lower insulating layer 22, the second upper insulating layer 52 is deposited to a thickness of 100 nm. Afterwards, the resist is removed.

The upper shield layer 60 is formed. FIG. 6E shows the condition after the upper shield layer 60 has been formed.

Figure 6F:
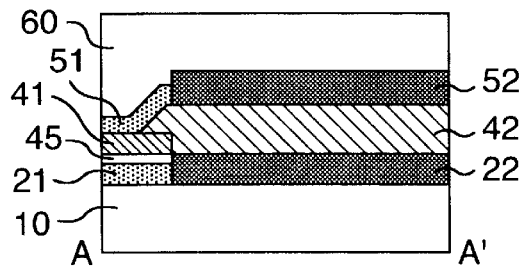
Figure 6E:
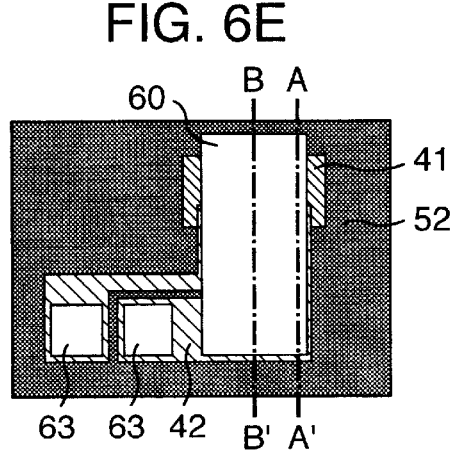
Figure 6G:
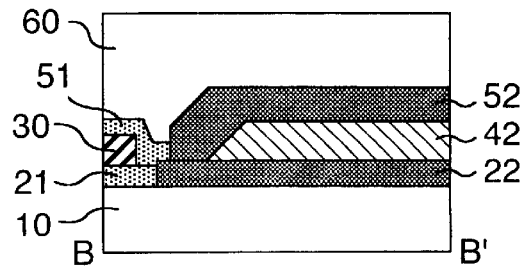

FIGS. 6F and 6G are sectional views taken along the lines A–A' and B–B', respectively (Note that those drawings do not show the portion of the substrate to be cut away when the magnetic head is mounted on the slider.). In the above-mentioned method, a high-resistivity insulating film is used for at the portion in which at least the MR sensor 30 and the lower shield layer or the upper shield layer face each other, and there is no worry about noise caused by current splitting. Furthermore, because the lower shield layer 10, the second electrode layer 42 which are electrically connected to the MR sensor 30 and the upper shield layer 60, are connected through low-resistivity insulating films, even if static electric charge accumulates in the shield layer or the electrode layer, a leak current flows through the low-resistivity insulating film, thus reducing a potential difference and decreasing chances of dielectric breakdown. This low-resistivity insulating film, when it is under a low voltage at which the magnetic head is operating in the magnetic recording apparatus, has a high resistivity close to that of a high-resistivity insulating film, such as alumina, in other words, a much higher resistivity than metals. Therefore, it never occurs that a current splits from the electrode layer and flows to the shield layer.

Figure 7A:
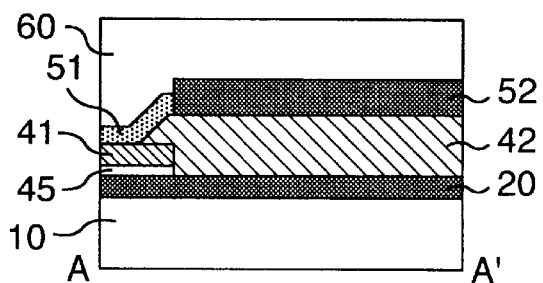
FIGS. 7A and 7B are sectional views in the depth direction of the reproducing head part of the magneto-resistive effect type head structure according to a second embodiment of the present invention.
Figure 7B:
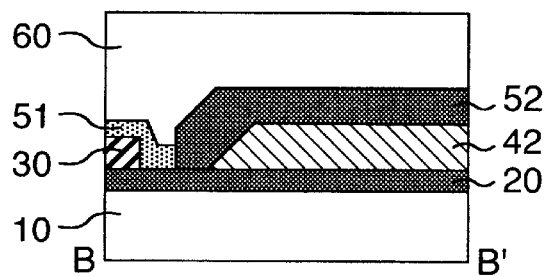

FIGS. 7A and 7B show a second embodiment of the present invention. FIGS. 7A and 7B, like in FIGS. 5A and 5B, indicate the cross sections taken along the planes A and B of the magnetic head shown in FIG. 1.

The second embodiment is a case of using a low-resistivity insulating film for the whole lower insulating layer or for the whole upper insulating layer. In this case, a low-resistivity insulating film should preferably be used for the whole lower insulating layer or the whole upper insulating layer by considering the insulation properties of the material used and a decrease of breakdown voltage due to the decrease in film thickness of the stepped portion of the magnetic head. The advantage of this method is that the manufacturing process can be made shorter than in the first embodiment. Let us consider how to use a low-resistivity insulating film for the lower insulating layer. In the first embodiment, because the second lower insulating layer is formed, the first lower insulating layer must be formed in a specified shape. In contrast, if a low-resistivity insulating film is used for the lower insulating layer as a unified layer, the process for forming the first and second insulating layers into specific shapes can be shortened.

Description will proceed to a third embodiment of the present invention.

If the area of the metal layers holding a low-resistivity insulating film between them is large, a minute current flowing through the low-resistivity insulating film amounts to much, thus decreasing chances of incurring dielectric breakdown by static electricity. Therefore, the area should be wide for the shield layer and the electrode layer holding the low-resistivity insulating layer between them. However, for some reasons, it may become necessary to make the area of the shield layer small. Description will be made of an example where the area of the upper shield layer is made small.

Figure 8A:
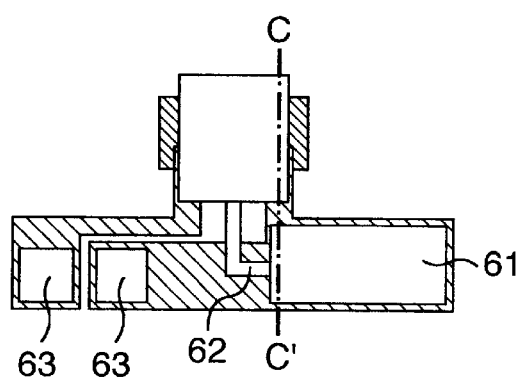
FIGS. 8A and 8B are pattern diagrams after the formation of the upper shield layer of the reproducing head part of the magneto-resistive effect type head structure according to a third embodiment of the present invention.

FIG. 8A shows the condition when the head structure has been formed up to the upper shield layer whose area is reduced (which corresponds to the magnetic head in FIG. 6F according to the first embodiment. The upper shield layer 60 is in a small shape specified for some reasons. At lower right of the drawing, a terminal 61 is formed by using a low-resistivity insulating layer, and the terminal 61 performs the function to reduce potential difference between the upper shield layer 60 and the second electrode layer 42.

In addition, a wiring pattern 62 is formed by connecting the upper shield layer 60 to the terminal 61 so as to make the upper shield layer 60 and the terminal 61 equipotentials each other. No specific properties except high electric conductivity are required for the materials forming the terminal 61 and the wiring pattern 62. If the same material as with the upper shield layer 60 is used for the terminal 61 and the wiring pattern 62, these parts can be formed easily and simultaneously with the process of forming the upper shield layer 60. The second electrode layer 42 needs to be so formed as to face the terminal 61 through the intermediary of a low-resistivity insulating film. The second electrode layer 42 may be expanded so as to face the terminal 61 as shown in FIG. 8A for example.

Figure 8B:
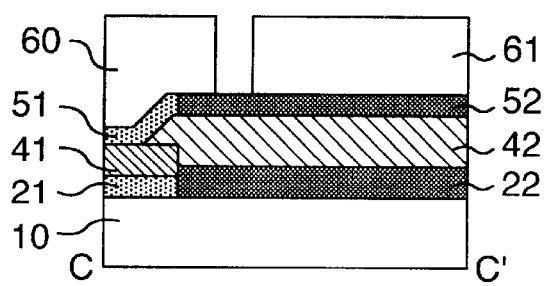
Figure 9:
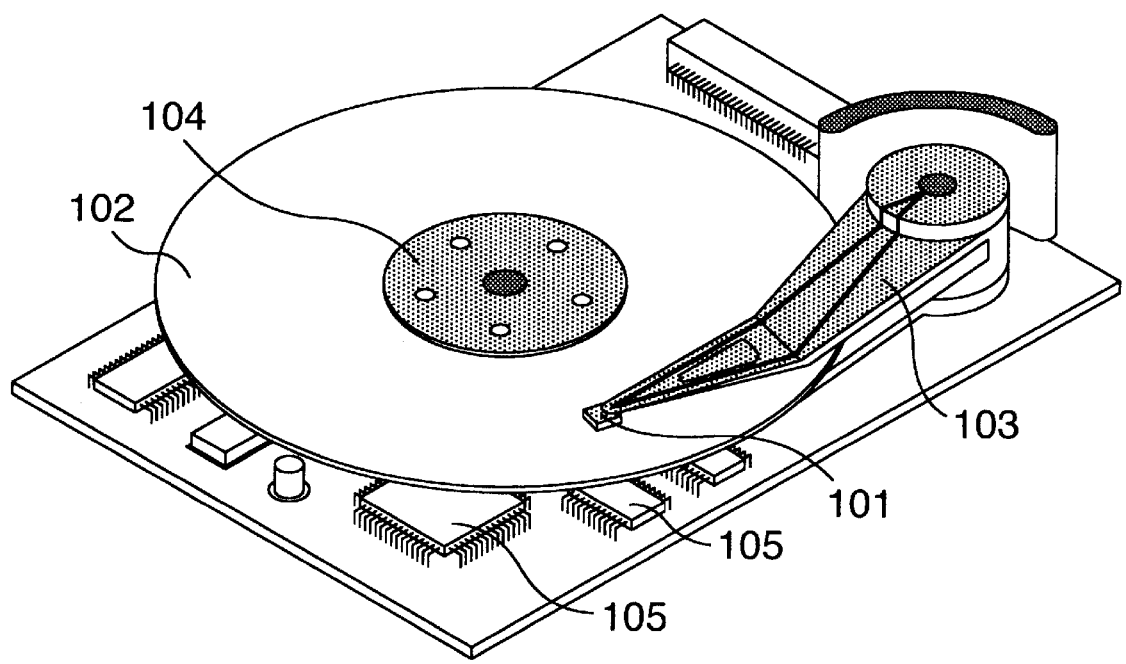
FIG. 9 is a schematic diagram of a magnetic recording apparatus.

FIG. 8B shows a cross section taken along the line C—C in FIG. 8A (Note that this drawing does show the portion to be cut away when the magnetic head is mounted on the slider.). The upper shield layer 60 is, only in a small area thereof, in contact with the low-resistivity insulating film but the terminal 61 in a wide area thereof faces the second electrode layer 42 through the intermediary of the low-resistivity insulating film. Therefore, if electric charge, such as static electricity, is stored in the upper shield layer 60, a minute current flows through the terminal 61 and the second upper insulating layer 52 to the second electrode layer 42. In consequence, a potential difference between the shield layer 60 and the second electrode layer 42 (the first electrode 41 and the MR sensor 30 electrically connected the electrode layer 42) is reduced, thus decreasing chances of dielectric breakdown. In the third embodiment, the upper shield layer 60 is, only in a small area, in contact with the low-resistivity insulating film, but may be without any contact with the low-resistivity insulating film at all so long as the area of the terminal 61 is sufficiently large.

As has been described, by forming a portion of the insulating layer in which the MR sensor 30 and at least the lower shield layer or the upper shield layer face each other by a high-resistivity insulating film and forming the other portion of the insulating layer in which the MR sensor 30 and the lower shield layer or the upper shield layer do not face by a low-resistivity insulating film, even if excess static charge is stored in the lower shield layer, the electrode layer (or the MR sensor) or the upper shield layer, a minute current flows through the low-resistivity insulating film, thus enabling potential differences to be reduced between the lower shield layer, the electrode layer (or the MR sensor) and the upper shield layer. This makes it possible to prevent the insulating layers from suffering dielectric breakdown by static electricity. Meanwhile, when there is no excess static electricity stored, the low-resistivity insulating film has a very high resistivity compared with metals, and therefore it never occurs that a sense current splits from the electrode layer and flows into the shield layers, and gives rise to noise.

What is claimed is:

1. A magneto-resistive effect type head comprising between a lower shield layer and an upper shield layer:
   an MR sensor including a thin film having at least a magneto-resistive effect or a giant magneto-resistive effect,
   bias layers for applying a longitudinal bias magnetic field to said MR sensor, and
   electrode layers for supplying a detection current to said MR sensor, and
   a lower insulating layer between said MR sensor and said lower shield layer and an upper insulating layer between said MR sensor and said upper shield layer, said two insulating layers being located at that part of said head which faces a magnetic medium,
   wherein portions of said lower and upper insulating layers in which said MR sensor and said lower and upper shield layers do not face each other have a lower resistivity than the other portions of said lower and upper insulating layers in which said MR sensor and said lower and upper shield layers face each other.

2. A magneto-resistive effect type head according to claim 1, wherein the insulating film of the portions of said lower and upper insulating layers in which said MR sensor and said lower and upper shield layers do not face each other is formed by a nitride or oxy nitride of aluminum, silicon or a mixture of these elements.

3. A magneto-resistive effect type head according to claim 1, wherein the insulating film of the portions of said lower and upper insulating layers in which said MR sensor and said lower and upper shield layers do not face each other has a characteristic that the resistivity at an applied electric field of 3 MV/cm is $1/1000$ or less of the resistivity at an applied electric field of 1 MV/cm.

4. A method for manufacturing a magneto-resistive effect type head set forth in claim 1 comprising the steps of:
   forming a lower shield layer on a substrate;
   forming a high-resistivity insulating film on said lower shield layer by sputtering or CVD;
   etching said high-resistivity insulating film into a specified shape;
   forming said MR sensor into a specified shape;
   forming a low-resistivity insulating film by sputtering or CVD;
   etching said low-resistivity insulating film into a specified shape; and
   forming said upper shield layer.

5. A method of manufacturing a magneto-resistive effect type head set forth in claim 1, comprising the steps of:
   forming a lower shield layer on a substrate;
   forming a high-resistivity insulating film on said lower shield layer by sputtering or CVD;
   etching said high-resistivity insulating film into a specified shape;
   forming said MR sensor into a specified shape;
   forming a low-resistivity insulating film in a specified shape by sputtering or CVD with a resist pattern; and
   forming said upper shield layer.

6. A method for manufacturing a magneto-resistive effect type head set forth in claim 1, comprising the steps of:
   forming a lower shield layer on a substrate;
   forming a high-resistivity insulating film on said lower shield layer in a specified shape by sputtering or CVD with a resist pattern;
   forming said MR sensor into a specified shape;
   forming a low-resistivity insulating film by sputtering or CVD;
   etching said low-resistivity insulating film into a specified shape; and
   forming said upper shield layer.

7. A method for manufacturing a magneto-resistive effect type head set forth in claim 1, comprising the steps of:
   forming a lower shield layer on a substrate;
   forming a high-resistivity insulating film on said lower shield layer in a specified shape by sputtering or CVD with a resist pattern;
   forming said MR sensor into a specified shape;
   forming a low-resistivity insulating film in a specified shape by sputtering or CVD with a resist pattern; and
   forming said upper shield layer.

8. A magnetic recording apparatus comprising:
   a magneto-resistive effect type head set forth in claim 1;
   a magnetic recording medium placed in a position to face said magneto-resistive effect type head;

means for driving said magneto-resistive effect type head;
means for driving said magnetic recording medium; and
means for processing recording/reproducing signals.

9. A method for forming a magneto-resistive effect type set forth in any of claim 1, comprising the steps of:
forming a lower shield layer on a substrate;
forming a first lower insulating layer on said lower shield layer in a specified shape by sputtering or CVD with a resist pattern;
forming a MR sensor in a specified shape;
forming a second lower insulating layer in a specified shape by sputtering or CVD with a resist pattern; and
forming said upper shield layer.

10. A magneto-resistive effect type head comprising between a lower shield layer and an upper shield layer:
an MR sensor including a thin film having at least a magneto-resistive effect or a giant magneto-resistive effect;
bias layers for applying a longitudinal bias magnetic field to said MR sensor;
electrode layers for supplying a detection current to said MR sensor;
a lower insulating layer between said MR sensor and a lower shield layer and an upper insulating layer between said MR sensor and an upper shield layer, said two insulating layers being located at that part of said head which faces a magnetic medium,
wherein a portion of said lower or upper insulating layer in which said MR sensor and said lower or upper shield layer do not face each other has a lower resistivity than the other portion of said lower or upper insulating layer in which said MR sensor and said lower or upper shield layer face each other, and wherein a total thickness of the portions of the lower and upper insulating layers in which said MR sensor and said lower or upper shield layer do not face each other is greater than a total thickness of the other portions of said lower and upper insulating layers in which said MR sensor and said lower or upper shield layer face each other.

11. A magnetic recording apparatus comprising:
a magneto-resistive effect type head set forth in claim 10;
a magnetic recording medium placed in a position to face said magneto-resistive effect type head;
means for driving said magneto-resistive effect type head;
means for driving said magnetic recording medium; and
means for processing recording/reproducing signals.

12. A method for forming a magneto-resistive effect type set forth in claim 10, comprising the steps of:
forming a lower shield layer on a substrate;
forming a first lower insulating layer on said lower shield layer in a specified shape by sputtering or CVD with a resist pattern;
forming said MR sensor in a specified shape;
forming a second lower insulating layer in a specified shape by sputtering or CVD with a resist pattern; and
forming said upper shield layer.

13. A magneto-resistive effect type head comprising between a lower shield layer and an upper shield layer:
an MR sensor including a thin film having at least a magneto-resistive effect or a giant magneto-resistive effect;
bias layers for applying a longitudinal bias magnetic field to said MR sensor;
a first electrode layer connected to said MR sensor;
a second electrode layer supplying a detection current to said first electrode layer;
a first lower insulating layer between said MR sensor and said first electrode and said bias layer, and said lower shield layer, and a second lower insulating layer between said second electrode layer and a lower shield layer;
a first upper insulating layer between said MR sensor 30 and said first electrode layer and said bias layer, and an upper shield layer; and
a second upper insulating layer between said second electrode layer and an upper shield layer,
wherein said second lower and upper insulating layers have a lower resistivity than said first lower and upper insulating layers, and wherein a total thickness of said second lower and upper insulating layers is greater than a total thickness of said first lower and upper insulating layers.

14. A magneto-resistive effect type head according to claim 13, wherein the insulating film of said second lower and upper insulating layers is formed by a nitride or oxy nitride of aluminum, silicon or a mixture of those elements.

15. A magneto-resistive effect type head according to claim 13, wherein the insulating film of said second lower and upper insulating layers has a characteristic that the resistivity at an applied electric field of 3 MV/cm is $\frac{1}{1000}$ or less of the resistivity at an applied electric field of 1 MV/cm.

16. A method for manufacturing a magneto-resistive effect type head set forth in claim 13, comprising the steps of:
forming a lower shield layer on a substrate;
forming said first lower insulating layer on said lower shield layer by sputtering or CVD;
etching said first lower insulating layer into a specified shape;
forming said MR sensor into a specified shape;
forming said second lower insulating layer by sputtering or CVD;
etching said second lower insulating layer into a specified shape; and
forming said upper shield layer.

17. A method for manufacturing a magneto-resistive effect type head set forth in claim 13, comprising the steps of:
forming a lower shield layer on a substrate;
forming a first lower insulating layer on said lower shield layer by sputtering or CVD;
etching said first lower insulating layer into a specified shape;
forming said MR sensor into a specified shape;
forming said second lower insulating layer by sputtering or CVD with a resist pattern; and
forming said upper shield layer.

18. A method for manufacturing a magneto-resistive effect type head set forth in claim 13, comprising the steps of:
forming a lower shield layer on a substrate;
forming said first lower insulating layer on said lower shield layer in a specified shape by sputtering or CVD with a resist pattern;
forming said MR sensor in a specified shape;
forming said second lower insulating layer by sputtering or CVD;
etching said second lower insulating layer into a specified shape; and
forming said upper shield layer.

19. A magnetic recording apparatus comprising:
a magneto-resistive effect type head set forth in claim 13;

a magnetic recording medium arranged to face said magneto-resistive effect type head;

means for driving said magneto-resistive effect type head;

means for driving said magnetic recording medium; and means for processing recording/reproducing signals.

20. A magneto-resistive effect type head comprising between a lower shield layer and an upper shield layer:

an MR sensor including a thin film having at least a magneto-resistive effect or a giant magneto-resistive effect;

bias layers for applying a longitudinal bias magnetic field to said MR sensor;

a first electrode layer connected to said MR sensor;

a second electrode layer supplying a detection current to said first electrode layer;

a lower insulating layer between said MR sensor and a lower shield layer at that part of said head which faces a magnetic medium; and an upper insulating layer between said MR sensor and an upper shield layer, wherein a portion of said lower or upper insulating layer in which said MR sensor, said first electrode layer, said bias layers and said lower or upper shield layer do not face each other is lower in resistivity than the other portion of said lower or upper insulating layer in which said MR sensor, said bias layer and said lower or upper shield layer face each other, and wherein a total thickness of the portion of said lower or upper insulating layer in which said MR sensor, said first electrode layer, said bias layers and said lower or upper shield layer do not face each other is greater than a total thickness of the other portion of said lower or upper insulating layer in which said MR sensor, said first electrode layer, said bias layers and said lower or upper shield layer face each other.

* * * * *